US012276399B2

(12) United States Patent
Hu et al.

(10) Patent No.: US 12,276,399 B2
(45) Date of Patent: Apr. 15, 2025

(54) HIGH BAY LIGHT

(71) Applicants: ETI SOLID STATE LIGHTING INC, Wheeling, IL (US); CRAWFORD GLOBAL LIMITED, Hong Kong (CN)

(72) Inventors: Wuzhi Hu, Guangdong (CN); Jialiu Hu, Guangdong (CN); Songhong Ding, Guangdong (CN); Xiongwen Yin, Guangdong (CN)

(73) Assignees: ETI SOLID STATE LIGHTING INC, Wheeling, IL (US); CRAWFORD GLOBAL LIMITED, Hong Kong (CN)

(*) Notice: Subject to any disclaimer, the term of this patent is extended or adjusted under 35 U.S.C. 154(b) by 0 days.

(21) Appl. No.: 18/655,316

(22) Filed: May 5, 2024

(65) Prior Publication Data

US 2024/0369204 A1 Nov. 7, 2024

(30) Foreign Application Priority Data

May 5, 2023 (CN) ........................ 202321060754.7

(51) Int. Cl.

| | |
|---|---|
| ***F21V 1/10*** | (2006.01) |
| ***F21S 8/06*** | (2006.01) |
| ***F21V 19/00*** | (2006.01) |
| ***F21V 23/00*** | (2015.01) |

(52) U.S. Cl.

CPC ............ *F21V 1/10* (2013.01); *F21V 19/0055* (2013.01); *F21V 23/009* (2013.01); *F21S 8/061* (2013.01)

(58) Field of Classification Search

CPC ...... F21V 1/10; F21V 19/0055; F21V 23/009; F21S 8/061

USPC .......................................................... 362/372

See application file for complete search history.

(56) References Cited

U.S. PATENT DOCUMENTS

| | | | | |
|---|---|---|---|---|
| 11,408,599 | B1 * | 8/2022 | Oross | F21V 21/30 |
| 2015/0354794 | A1 * | 12/2015 | Guercio | F21V 29/745 362/249.1 |

FOREIGN PATENT DOCUMENTS

| | | | | |
|---|---|---|---|---|
| CN | 115127069 A * | 9/2022 | | |
| DE | 202009003239 U1 * | 8/2009 | | F21S 8/086 |

* cited by examiner

*Primary Examiner* — Laura K Tso

(74) *Attorney, Agent, or Firm* — The Sun IP Law

(57) ABSTRACT

The present disclosure provides a high bay light, including an electrical box and a light body assembly, and the electrical box is provided with a power supply, the light body assembly includes a lampshade provided with a light source, the light source is electrically connected to the power supply, and connecting walls at both ends of the lampshade are rotatably hinged to supporting walls at both ends of the electrical box, respectively; the electrical box includes a side wall and a panel wall which are adjacently arranged. According to the high bay light of the present disclosure, a light-emitting projection direction is adjustable, a folding operation is achieved, the structure is compact, and the overall volume size of the high bay light may be effectively reduced, thereby effectively reducing the packaging space and transportation cost of the product, and further reducing the unit price of the product.

20 Claims, 12 Drawing Sheets

HIGH BAY LIGHT

CROSS-REFERENCE TO RELATED APPLICATIONS

The present invention claims priority to and the benefit of Chinese Patent Application No. 202321060754.7, filed with the China National Intellectual Property Administration on May 5, 2023, which is hereby incorporated by reference in its entirety.

TECHNICAL FIELD

The present disclosure relates to the technical field of lighting, and in particular to a folding high bay light capable of adjusting a light-emitting projection direction.

BACKGROUND OF THE INVENTION

A high bay light, suitable for lighting in large and spacious places such as factories, power plants, steel plants, workshops, warehouses, gymnasiums, waiting rooms, stations, oil stations, airports, shopping malls, and supermarkets, is generally used for global lighting and hung at a higher position, and adopts a light source with a high color rendering index such as a metal halide lamp, an energy-saving lamp, a Light Emitting Diode (LED) and an electrodeless lamp.

In order to adjust a light-emitting projection direction for different scenes, a light body assembly of the existing high bay light is rotatably arranged on a side surface of an electrical box thereof, the light body assembly includes a pull rod, the pull rod is provided with a first end and a second end which are opposite to each other, an end cover is provided with a plurality of angle adjustment holes, the first end of the pull rod is connected to an end of the electrical box, and the second end of the pull rod is connected in one of the plurality of angle adjustment holes to maintain a stable angle between the light body assembly and the electrical box. The number of the pull rods is four.

However, in the process of adjusting the light-emitting projection direction of the existing high bay light, the second ends of the four pull rods need to be taken out from one of the corresponding plurality of angle adjustment holes, so that the light body assembly and the electrical box may rotate, then the light body assembly rotates to the angle in the required light-emitting projection direction relative to the electrical box, and then the second ends of the four pull rods are connected in one of the corresponding plurality of angle adjustment holes, the operation is complex to affect the operational convenience, and the existing high bay light is complex in structure and high in production cost.

Furthermore, in order to ensure that there is sufficient space between the light body assembly and the electrical box to rotatably adjust the light-emitting projection direction, a distance between the light body assembly and the electrical box of the existing high bay light is large, resulting in a large overall volume of the high bay light, thereby increasing the product packaging and transportation costs.

SUMMARY OF THE INVENTION

Some embodiments of the present disclosure is to provide a folding high bay light capable of adjusting a light-emitting projection direction, which is compact in structure, and may effectively reduce the overall volume size of the high bay light, thereby effectively reducing the packaging space and transportation cost of the product, and further reducing the unit price of the product.

In order to achieve the main objective of the present disclosure, the present disclosure provides a high bay light, including an electrical box and a light body assembly. The electrical box is provided with a power supply, the light body assembly includes a lampshade provided with a light source, the light source is electrically connected to the power supply, and connecting walls at both ends of the lampshade are rotatably hinged to supporting walls at both ends of the electrical box, respectively. The electrical box includes a side wall and a panel wall which are adjacently arranged. When the lampshade rotates to be opposite to the side wall and parallel to a vertical direction, a minimum distance between a side surface, close to the side wall, of the lampshade and the side wall ranges from 0 mm to 30 mm; and/or, when the lampshade rotates to be opposite to the panel wall and parallel to a horizontal direction, a minimum distance between a side surface, close to the panel wall, of the lampshade and the panel wall ranges from 0 mm to 30 mm.

It may be seen from the above solution, that the connecting walls at both ends of the lampshade of the high bay light of the present disclosure are rotatably hinged to the supporting walls at both ends of the electrical box, respectively, so that an angle in the light-emitting projection direction of the light body assembly of the high bay light is adjustable, the irradiation range of the high bay light is not limited, and the high bay light is conveniently applied to different scenes. Meanwhile, the light body assembly of the high bay light of the present disclosure may be folded relative to the electrical box. When the lampshade rotates to be opposite to the side wall and parallel to the vertical direction, a minimum distance between the side surface, close to the side wall, of the lampshade and the side wall ranges from 0 mm to 30 mm, so that the width of the high bay light in the horizontal direction may be effectively reduced, thereby effectively reducing the overall volume size of the high bay light, effectively reducing the packaging space and transportation cost of the product, and reducing the unit price of the product. When the lampshade rotates to be opposite to the panel wall and parallel to the horizontal direction, a minimum distance between the side surface, close to the panel wall, of the lampshade and the panel wall ranges from 0 mm to 30 mm, so that the height of the high bay light in the vertical direction may be effectively reduced, thereby effectively reducing the overall volume size of the high bay light, effectively reducing the packaging space and transportation cost of the product, and reducing the unit price of the product. Therefore, the high bay light of the embodiment, the light-emitting projection direction is adjustable, a folding operation is achieved, and structure is compact, and the overall size of the high bay light may be effectively reduced, thereby effectively reducing the packaging space and transportation cost of the product, and further reducing the unit price of the product.

In an embodiment, when the lampshade rotates to be opposite to the side wall and parallel to the vertical direction, the minimum distance between the side surface, close to the side wall, of the lampshade and the side wall ranges from 0 mm to 20 mm; and/or, when the lampshade rotates to be opposite to the panel wall and parallel to the horizontal direction, the minimum distance between the side surface, close to the panel wall, of the lampshade and the panel wall ranges from 0 mm to 20 mm.

In an embodiment, when the lampshade rotates to be opposite to the side wall and parallel to the vertical direction, the minimum distance between the side surface, close to the side wall, of the lampshade and the side wall ranges from 0 mm to 7 mm; and/or, when the lampshade rotates to be opposite to the panel wall and parallel to the horizontal direction, the minimum distance between the side surface, close to the panel wall, of the lampshade and the panel wall ranges from 0 mm to 7 mm.

In an embodiment, the number of the light body assemblies is two, and the two light body assemblies are symmetrically arranged about the electrical box.

In an embodiment, one surface of the lampshade, away from the electrical box, is provided with a light-emitting surface. When light-emitting projection directions of the two light-emitting surfaces are the same, a backlight surface, which is opposite to the light-emitting surface of each lampshade, is adjacent to or attached to the panel wall; and/or, when light-emitting projection directions of the two light-emitting surfaces are the same, the two lampshades are adjacent or attached to each other side by side; and/or, when light-emitting projection directions of the two light-emitting surfaces are opposite, two backlight surfaces, which are opposite to the light-emitting surfaces of the two lampshades, are respectively adjacent to or attached to two opposite side walls of the electrical box.

In an embodiment, the connecting walls are rotatably hinged to the supporting walls through anti-loosening structures.

In an embodiment, each anti-loosening structure includes an anti-loosening screw and an elastic ring pad. A threaded section of the anti-loosening screw passes through one supporting wall and is in threaded connection with one connecting wall, or the threaded section of the anti-loosening screw passes through one connecting wall and is in threaded connection with one supporting wall. The elastic ring pad is sleeved on the threaded section of the anti-loosening screw, and both ends of the elastic ring pad are pressed between one supporting wall and one connecting wall.

It may be seen from the above solution, that in the operation process of adjusting the light-emitting projection direction of the high bay light of the present disclosure, because the anti-loosening structure of the high bay light of the present disclosure includes the anti-loosening screw and the elastic ring pad, the threaded section of the anti-loosening screw passes through one supporting wall and is in threaded connection with one connecting wall, or the threaded section of the anti-loosening screw passes through one connecting wall and is in threaded connection with one supporting wall, the connecting walls at both ends of the lampshade are rotatably hinged to the supporting walls at both ends of the electrical box, respectively. Meanwhile, the elastic ring pad is sleeved on the threaded section of the anti-loosening screw, and both ends of the elastic ring pad are pressed between one supporting wall and one connecting wall. The elastic ring pad is provided with an elastic deformation capability, so that an angle between the light body assembly and the electrical box may be maintained, and the angle between the light body assembly and the electrical box may be prevented from being changed by a relatively small force, thereby stably keeping the light body assembly and the electrical box at a angle in the required light-emitting projection direction. Therefore, a user only needs to overcome the friction force of the elastic ring pad to rotate the light body assembly of the high bay light to a angle in the required light-emitting projection direction relative to the electrical box, without too many other operation steps, and the operation is simple and convenient. Therefore, the angle in the light-emitting projection direction of the light body assembly of the high bay light is adjustable, so that the irradiation range of the high bay light is not limited, and the high bay light is conveniently applied to different scenes. Meanwhile, the light body assembly of the high bay light of the present disclosure may be folded relative to the electrical box, which may reduce the overall size of the high bay light, thereby reducing the packaging space and reducing the unit price of the product. In addition, the adjustment and folding operations of the light-emitting projection direction of the high bay light of the present disclosure are simple and convenient, compared with the complex structure of the existing high bay light for adjusting the light-emitting projection direction, the high bay light of the present disclosure directly uses the connecting walls at both ends of the lampshade to be rotatably hinged to the supporting walls at both ends of the electrical box through the anti-loosening structures, respectively, without additionally arranging parts or structural features such as a pull rod, an angle adjustment hole, a supporting plate and an end cover plate, so as to simplify the structural design, so that the structure of the high bay light of the present disclosure is simple, and the production cost may be effectively reduced.

In an embodiment, one side surface, close to the adjacent supporting wall, of each connecting wall is provided with a ring groove coaxial with the threaded section of the anti-loosening screw, a first end of the elastic ring pad is embedded in the ring groove, a second end of the elastic ring pad protrudes from the ring groove, and both ends of the elastic ring pad are pressed between the supporting wall and a groove bottom surface of the ring groove, respectively.

In an embodiment, each supporting wall is provided with a mounting hole in a penetrating manner, each connecting wall is provided with a mounting groove, and each connecting wall is provided with an internal threaded hole at one end of the mounting groove. The threaded section of the anti-loosening screw sequentially passes through the mounting hole and the mounting groove in a clearance fit manner and is in threaded connection with the internal threaded hole, and a head of the anti-loosening screw is pressed against the side surface, away from the adjacent connecting wall, of the supporting wall.

In an embodiment, a peripheral wall of the threaded section of the anti-loosening screw is coated with an anti-loosening adhesive layer; and/or, all surfaces of both ends of the elastic ring pad are pressed between one supporting wall and one connecting wall.

In an embodiment, the light source is arranged in the lampshade, one surface, away from the electrical box, of the lampshade is provided with a light-emitting surface, and the side, close to the light source, of the light-emitting surface is provided with one or more of an anti-glare panel, a diffusion plate and a light-transmitting plate; and/or, the side wall is provided with a heat dissipation hole in a penetrating manner; and/or, the light body assembly further includes a radiator, the radiator is arranged in the lampshade and located on a backlight surface of the light source.

In an embodiment, each supporting wall is provided with a lifting hole for lifting of a sling chain in a penetrating manner; or, each supporting wall is provided with two lifting holes for lifting of the sling chain in a penetrating manner, and the two lifting holes are symmetrically arranged about the electrical box; and/or, a mounting wall of the electrical box is provided with a fixed groove for being matched with a fixed pin of a ceiling mount seat, the fixed groove includes an arc-shaped narrow part and a circular wide part has a larger width than the arc-shaped narrow part at one end of the arc-shaped narrow part, the fixed pin is T-shaped, the fixed pin includes a top extends transversely and a thin part extends vertically, where the size of the top is less than that of the circular wide part and greater than that of the arc-shaped narrow part, and a size of the thin part is less than that of the arc-shaped narrow part; and/or, a mounting wall of the electrical box is provided with an assembly groove for mounting of a boom.

In an embodiment, one side surface of each supporting wall is provided with an angle pointer, one side surface of each connecting wall is provided with an angle dial around a rotating hinged axis, or, one side surface of each connecting wall is provided with an angle pointer, and one side surface of each supporting wall is provided with an angle dial around the rotating hinged axis. The angle pointer may be aligned with any angle scale line in the angle dial.

In an embodiment, the side wall is arranged perpendicular to the panel wall.

In an embodiment, the electrical box includes the panel wall and a box body with an opening at one end. The panel wall may cover the opening, the side wall is a part of a peripheral wall of the box body, an electrical assembly is mounted on a side surface, close to the box body, of the panel wall, and the electrical assembly includes the power supply.

In an embodiment, a first end of the panel wall is rotatably hinged to the box body, and a second end of the panel wall is connected to the box body through a set screw, so that the panel wall covers the opening; or the panel wall is detachably mounted at the opening in a covering manner.

Figure 1:
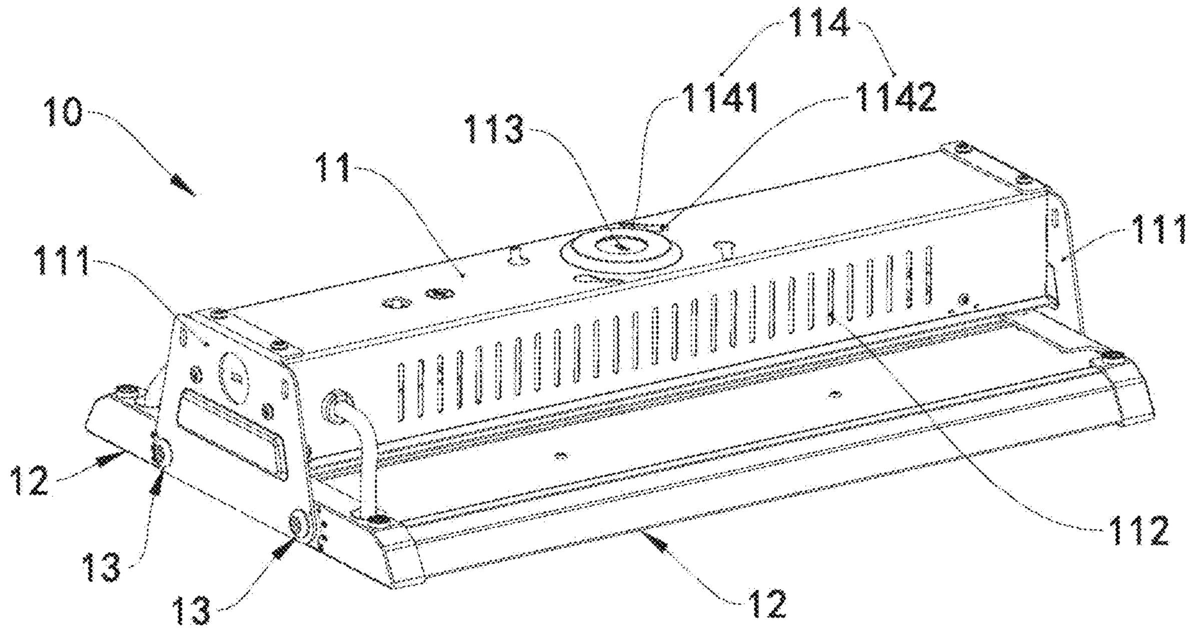
FIG. 1 is a structural diagram of an embodiment of a high bay light of the present disclosure from a first perspective.

The present disclosure is further described below with reference to the accompanying drawings and embodiments.

DETAILED DESCRIPTION OF THE INVENTION

Referring to FIGS. 1-17, an embodiment discloses a high bay light 10, including an electrical box 11 and a light body assembly 12. The electrical box 11 is provided with a power supply 14, light body assembly 12 includes a lampshade 121 provided with a light source 122, the light source 122 is electrically connected to the power supply 14, and connecting walls 1212 at both ends of the lampshade 121 are rotatably hinged to supporting walls 111 at both ends of the electrical box 111, respectively. Specifically, the electrical box 11 includes a side wall 117 and a panel wall 115 which are adjacently arranged. When the lampshade 121 rotates to be opposite to the side wall 117 and parallel to a vertical direction, a minimum distance H3 between a side surface, close to the side wall 117, of the lampshade 121 and the side wall 117 ranges from 0 mm to 30 mm; and/or, when the lampshade 121 rotates to be opposite to the panel wall 115 and parallel to a horizontal direction, a minimum distance H4 between a side surface, close to the panel wall 115, of the lampshade 121 and the panel wall 115 ranges from 0 mm to 30 mm. The vertical direction is a direction perpendicular to the ground, and the horizontal direction is perpendicular to the vertical direction.

Figure 2:
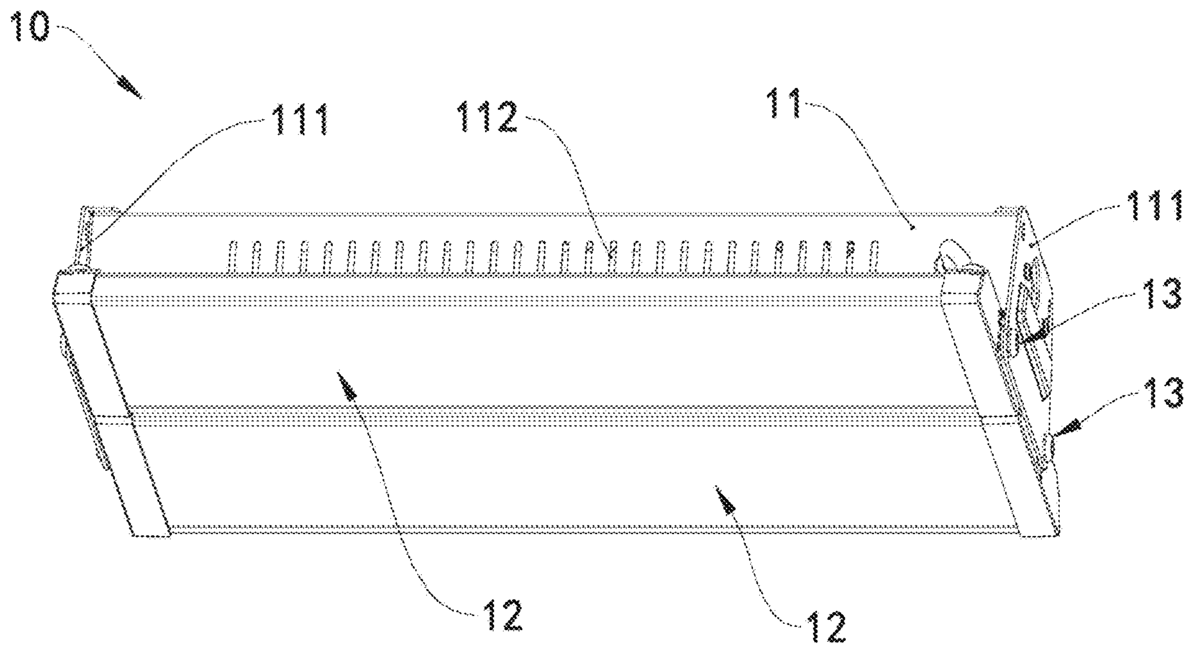
FIG. 2 is a structural diagram of an embodiment of a high bay light of the present disclosure from a second perspective.
Figure 3:
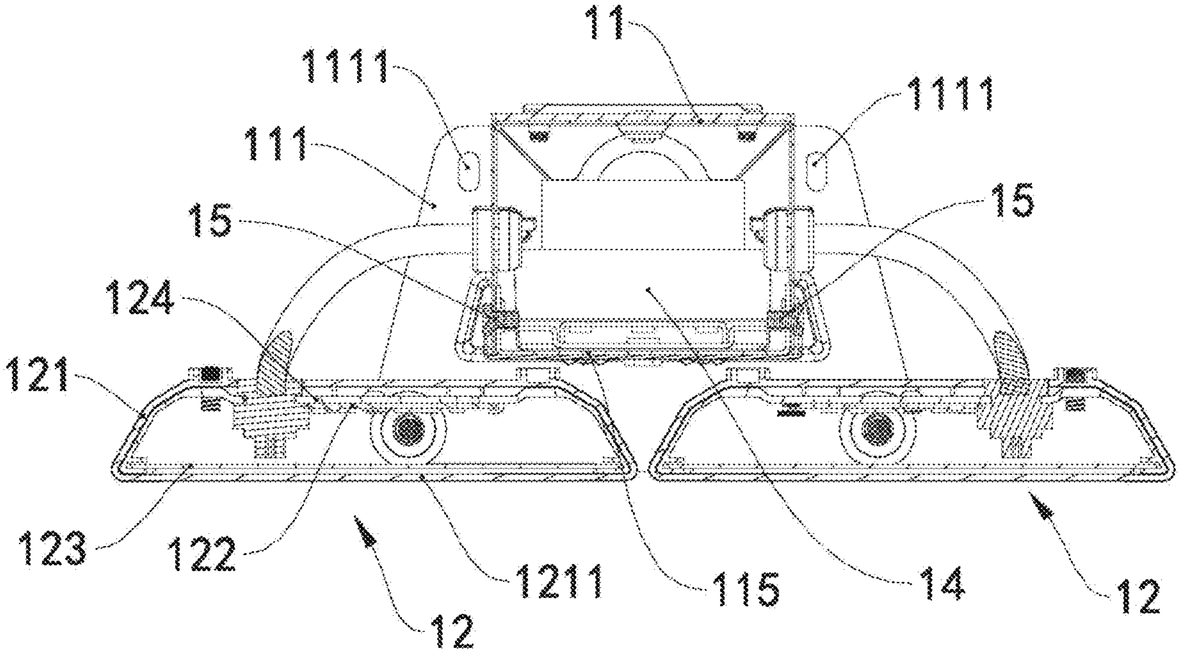
FIG. 3 a section view of an embodiment of a high bay light of the present disclosure from a first perspective.
Figure 4:
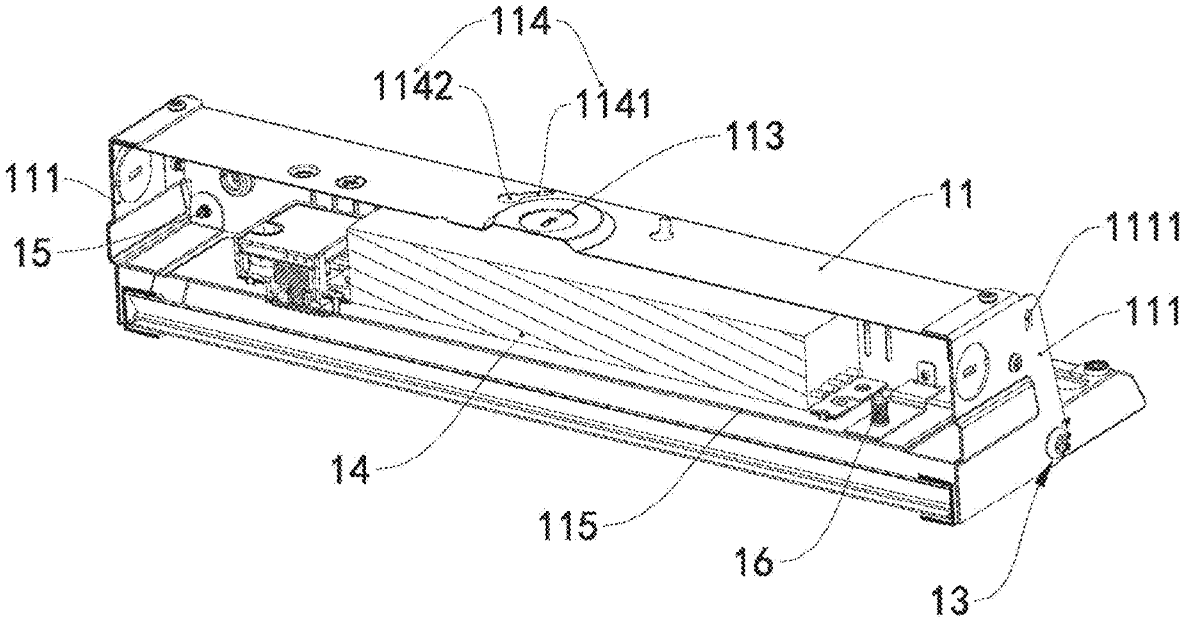
FIG. 4 is a section view of an embodiment of a high bay light of the present disclosure from a second perspective.
Figure 5:
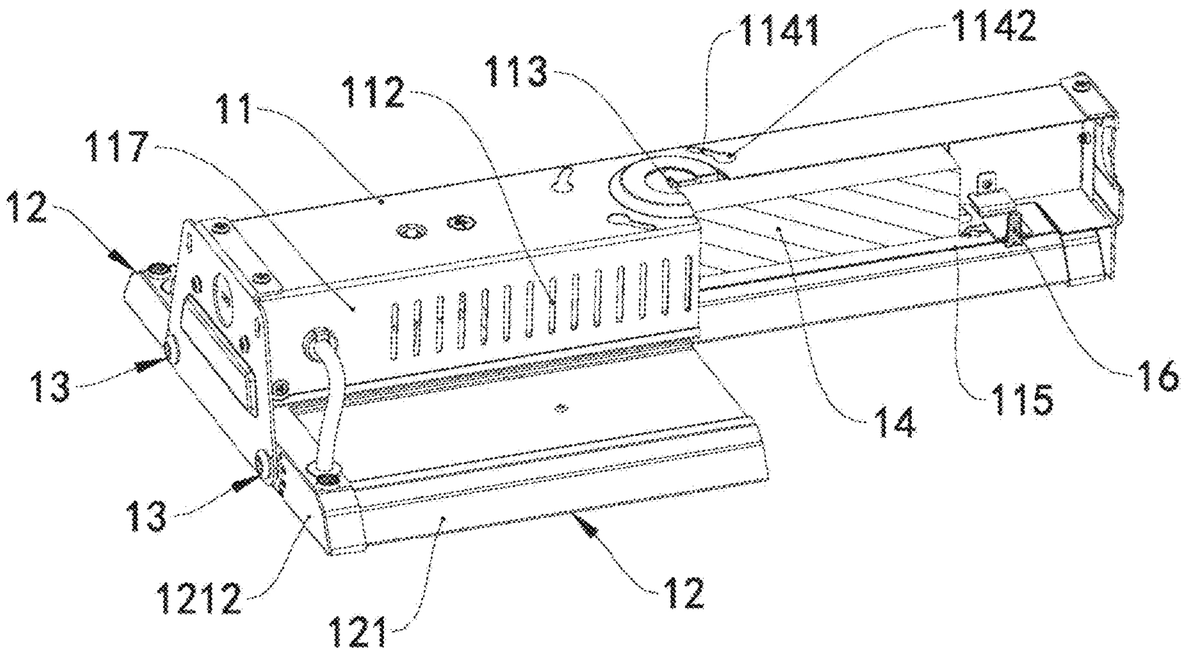
FIG. 5 is a section view of an embodiment of a high bay light of the present disclosure from a third perspective.
Figure 6:
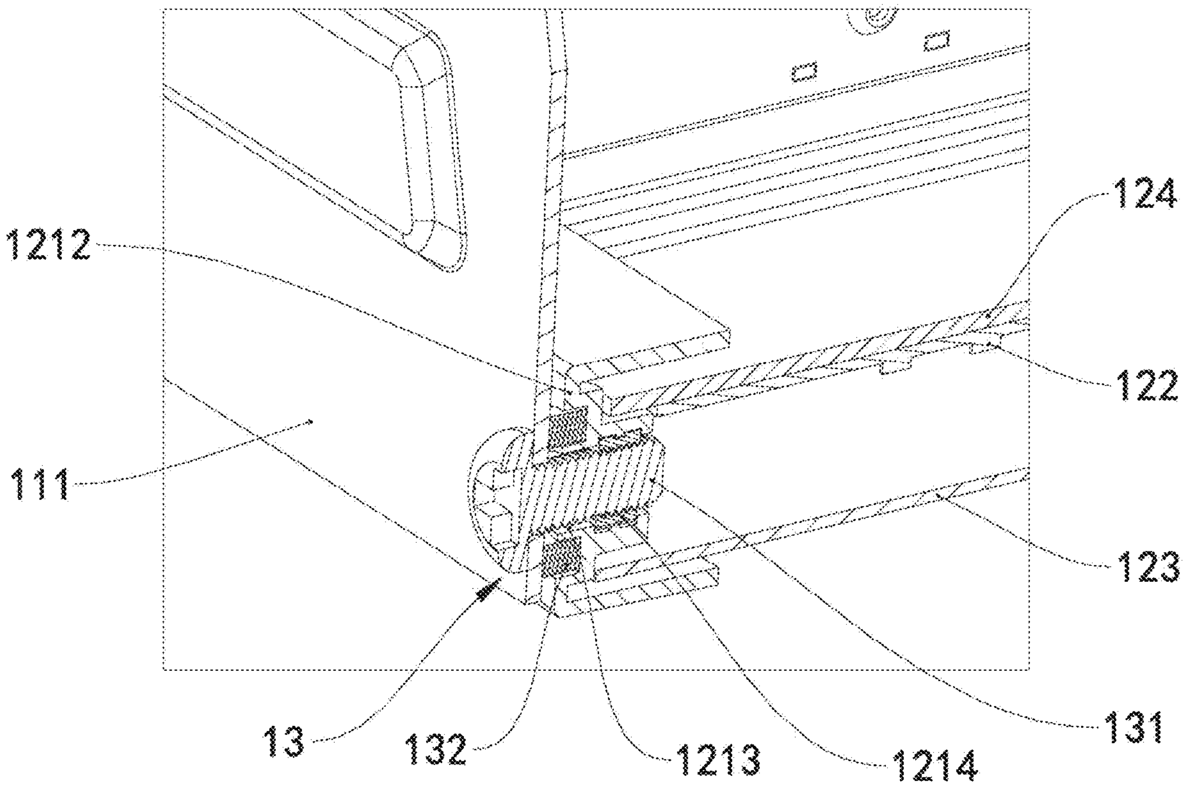
FIG. 6 a section view of an embodiment of a high bay light of the present disclosure from a fourth perspective.
Figure 7:
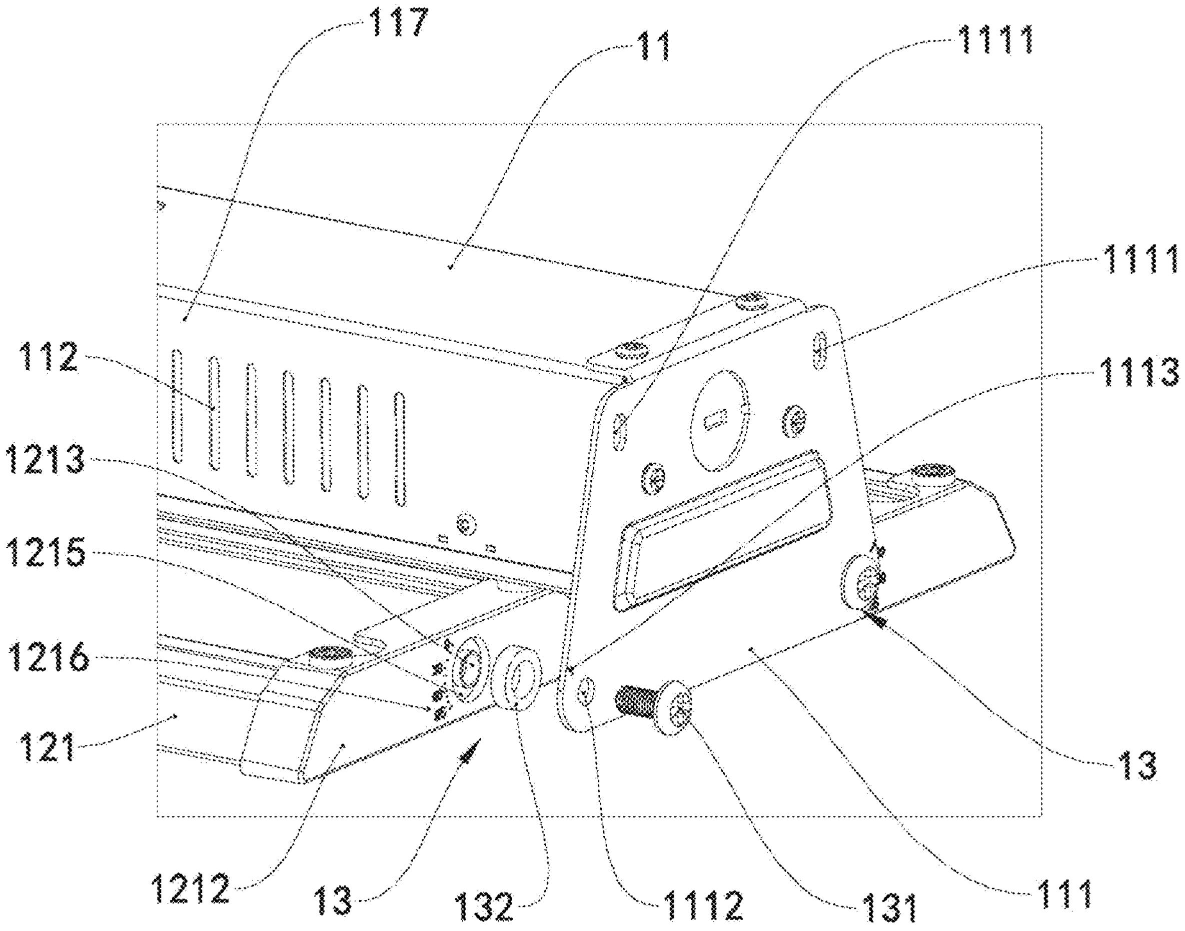
FIG. 7 is a structural decomposition diagram of an anti-loosening structure in an embodiment of a high bay light of the present disclosure.
Figure 8:
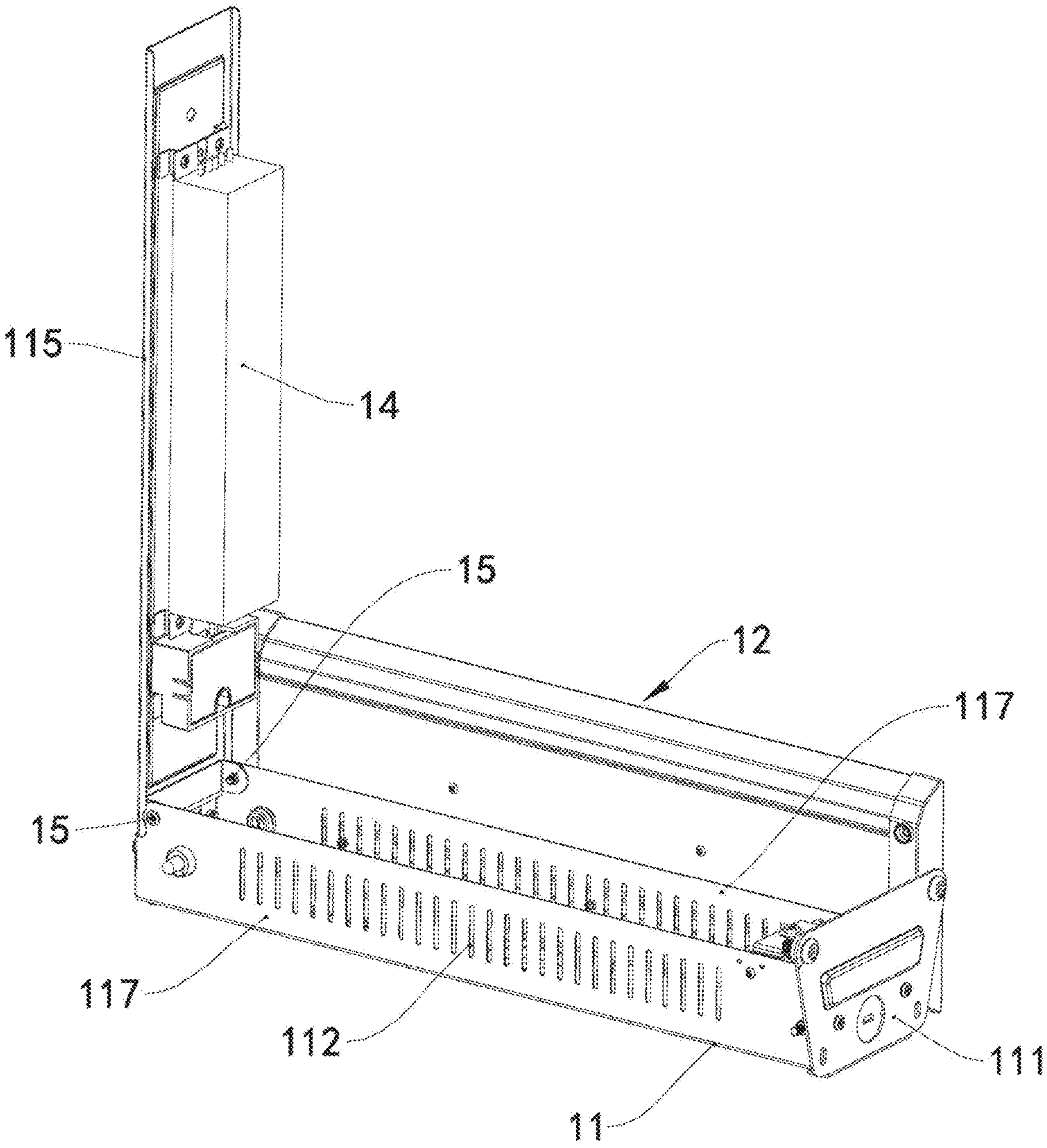
FIG. 8 is a first structural diagram of a panel wall in an open state in an embodiment of a high bay light of the present disclosure.
Figure 9:
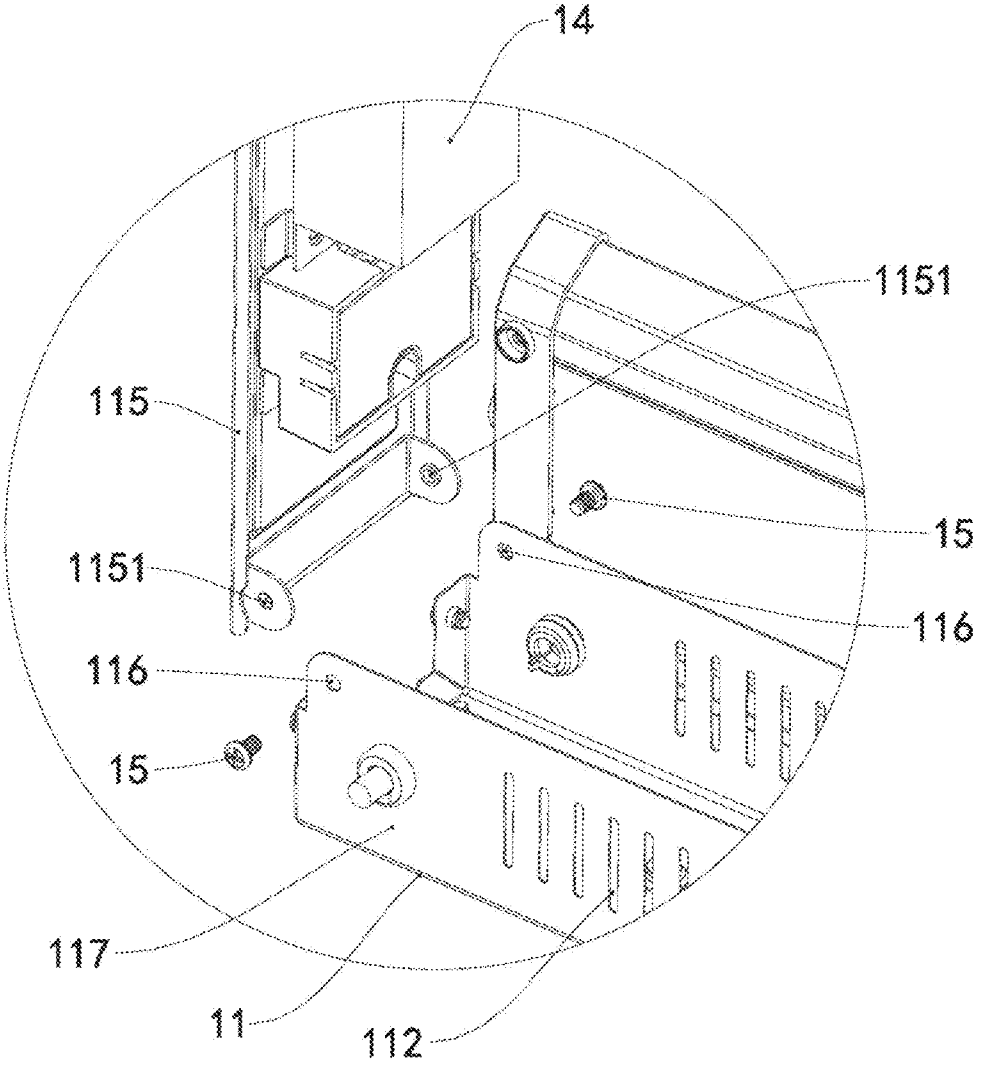
FIG. 9 is a structural decomposition diagram of a hinged panel wall in an embodiment of a high bay light of the present disclosure.
Figure 10:
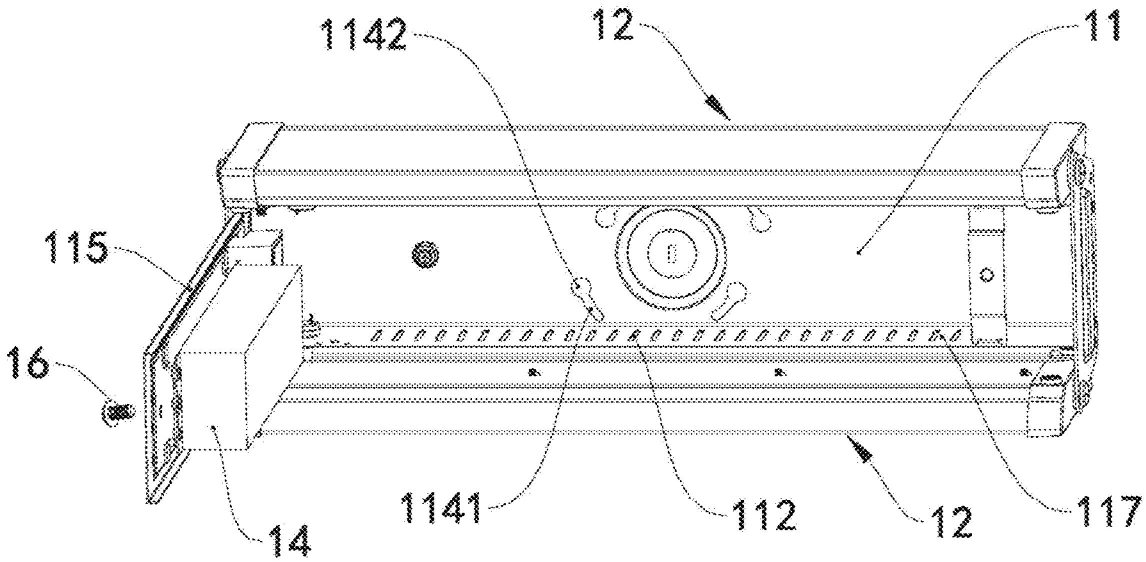
FIG. 10 is a second structural diagram of a panel wall in an embodiment of a high bay light of the present disclosure in an open state.
Figure 11:
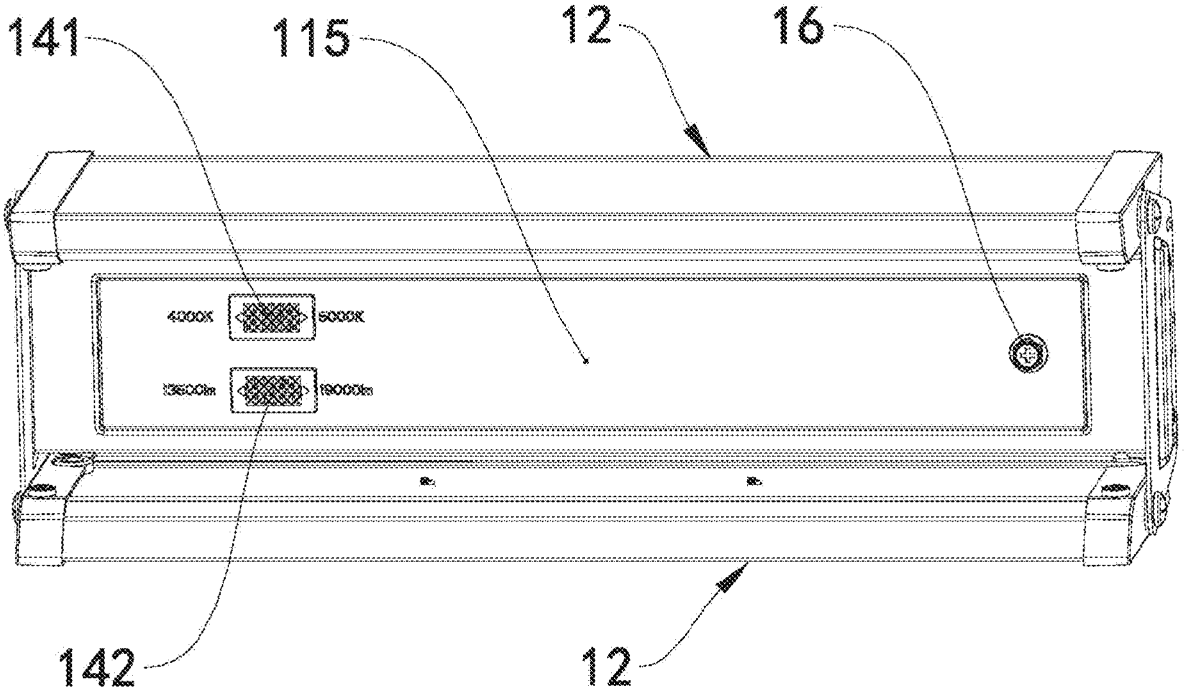
FIG. 11 is a structural diagram of a panel wall in an embodiment of a high bay light of the present disclosure in a closed state.
Figure 12:
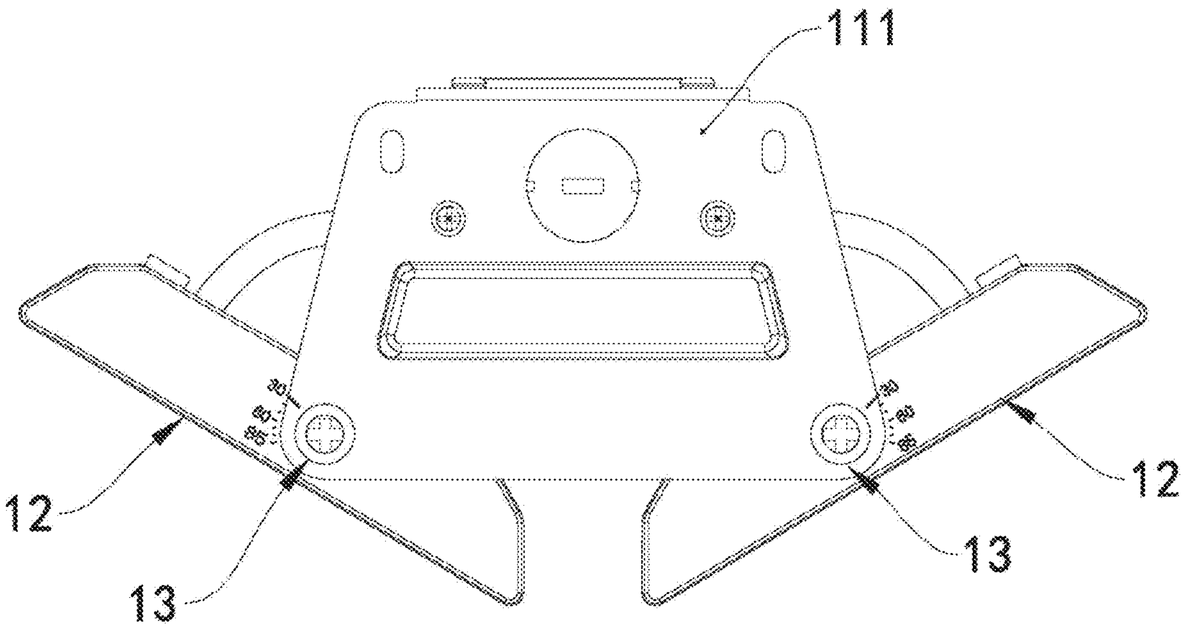
FIG. 12 is a side view of a light body assembly in an embodiment of a high bay light of the present disclosure in a 30° light-emitting projection direction.
Figure 13:
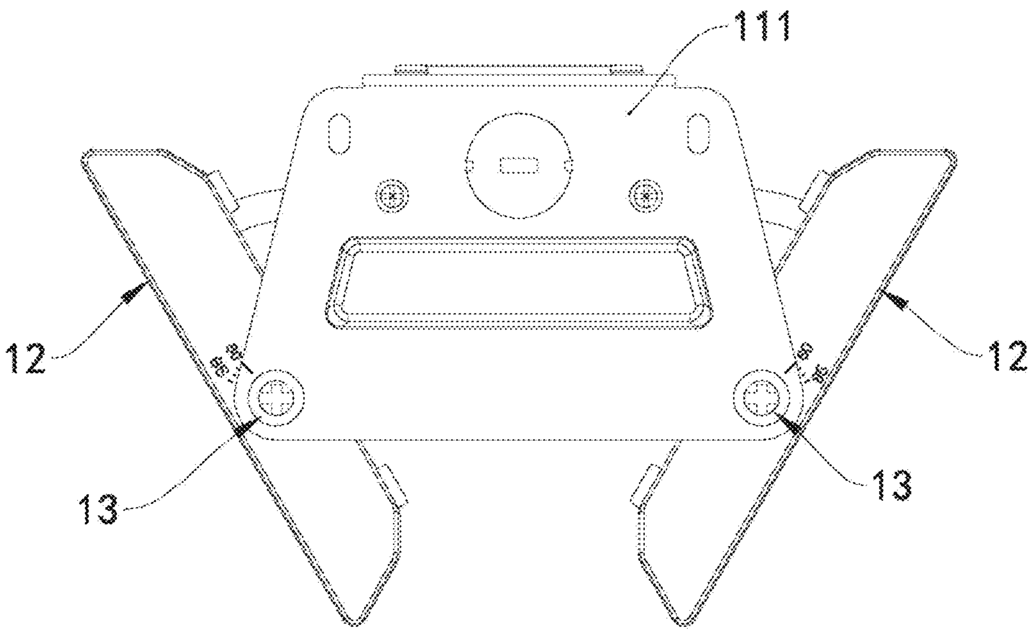
FIG. 13 is a side view of a light body assembly in an embodiment of a high bay light of the present disclosure in a 60° light-emitting projection direction.
Figure 14:
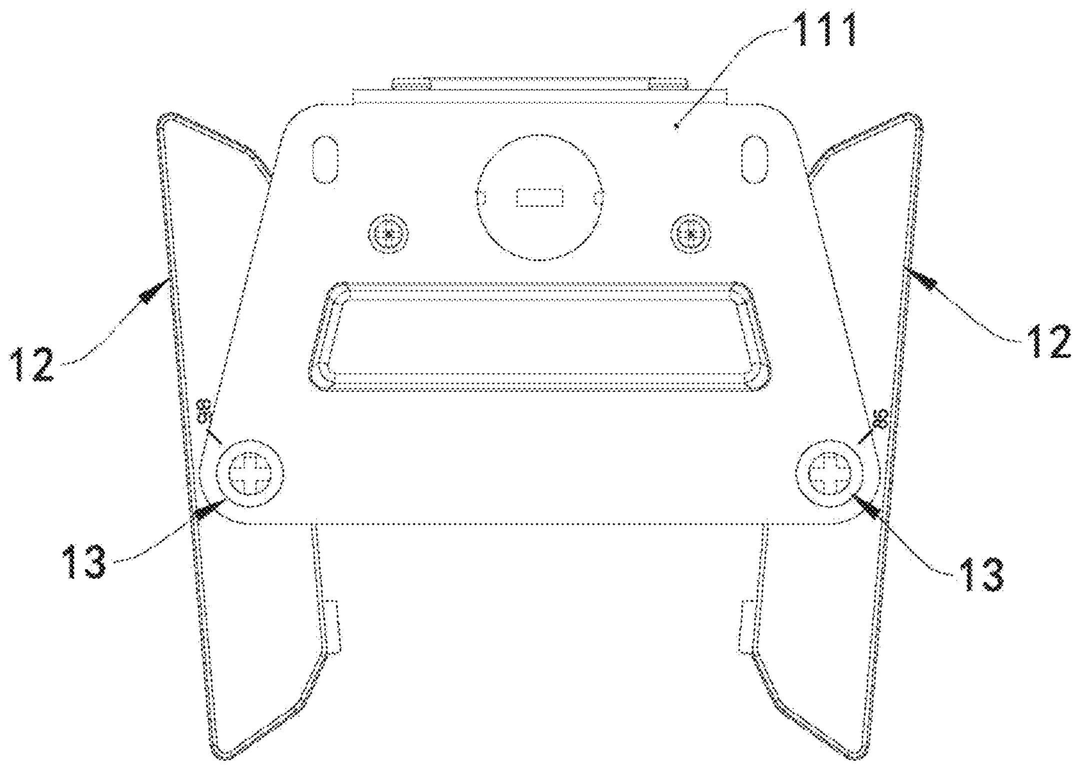
FIG. 14 is a side view of a light body assembly in an embodiment of a high bay light of the present disclosure in an 85° light-emitting projection direction.
Figure 15:
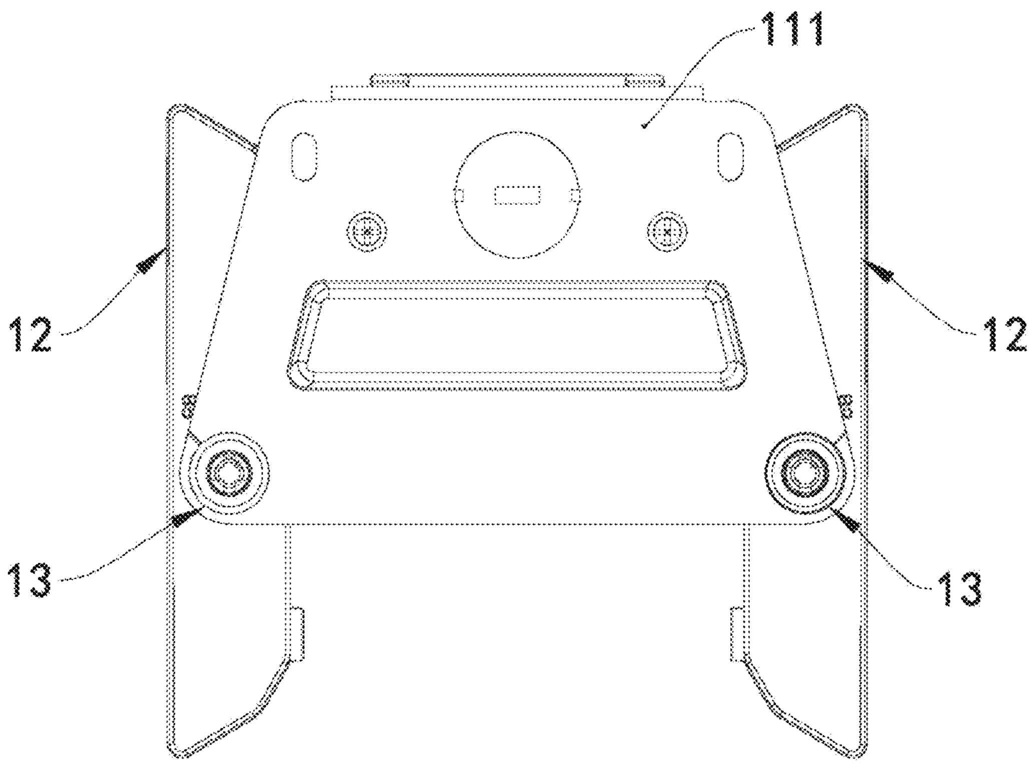
FIG. 15 is a side view of a light body assembly in an embodiment of a high bay light of the present disclosure in a 90° light-emitting projection direction.
Figure 16:
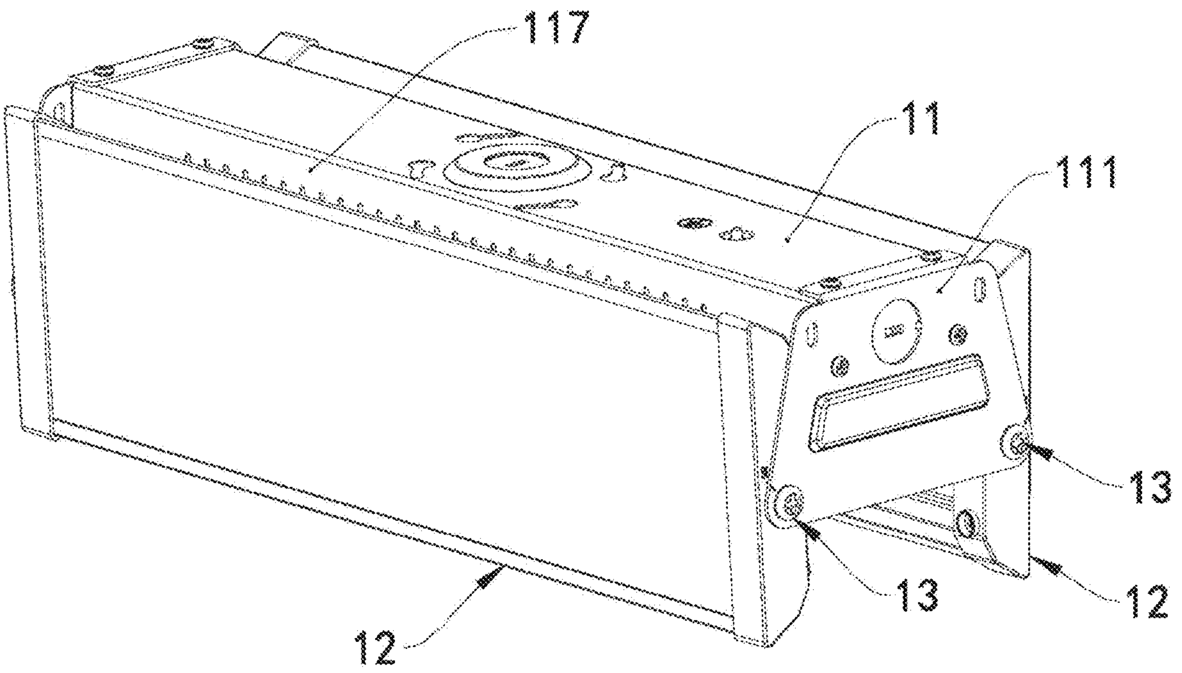
FIG. 16 is a structural diagram of a light body assembly in an embodiment of a high bay light of the present disclosure in a 90° light-emitting projection direction.
Figure 17:
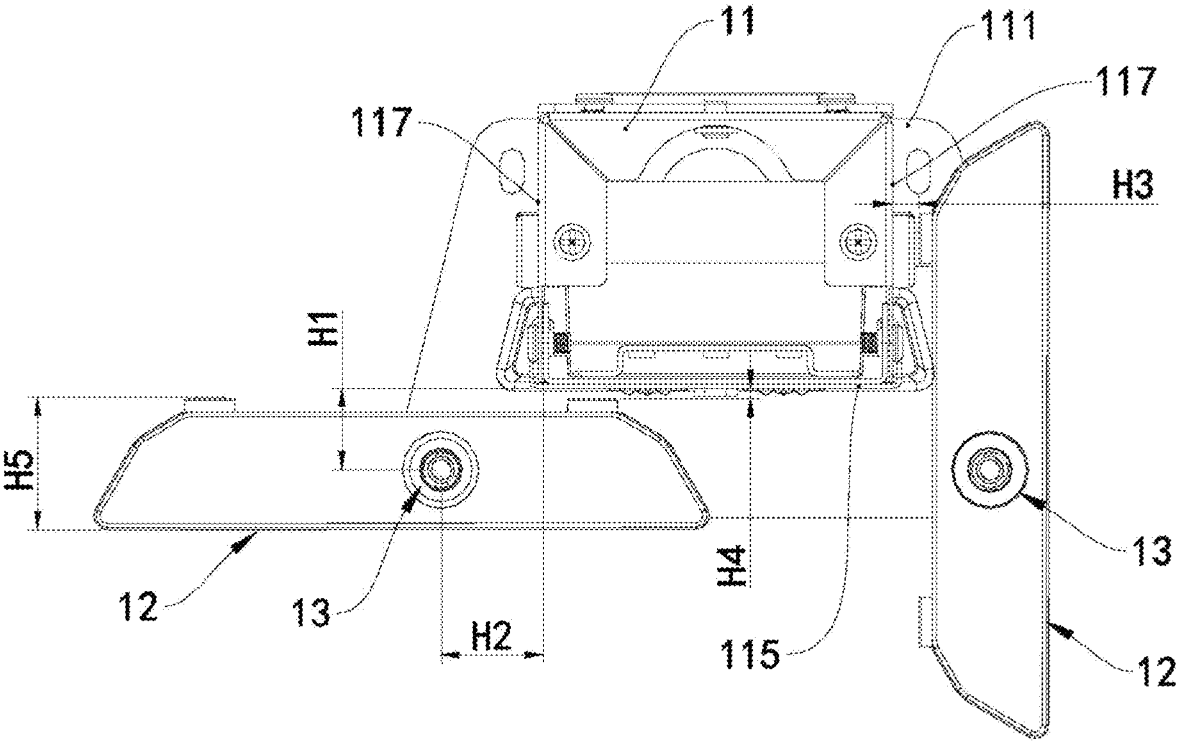
FIG. 17 is a schematic diagram of a light body assembly in an embodiment of a high bay light of the present disclosure in a 0° light-emitting projection direction and the other light body assembly in a 90° light-emitting projection direction.

The connecting walls 1212 at both ends of the lampshade 121 of the high bay light 10 of the embodiment are rotatably hinged to the supporting walls 111 at both ends of the electrical box 11, respectively, so that an angle in a light-emitting projection direction of the light body assembly 12 of the high bay light 10 is adjustable. As shown in FIGS. 12-17, the high bay light 10 of the embodiment is adjusted to different light-emitting projection directions, FIG. 12 is a side view of a light body assembly 12 in a high bay light 10 of the embodiment in a 30° light-emitting projection direction, FIG. 13 is a side view of a light body assembly 12 in a high bay light 10 of the embodiment in a 60° light-emitting projection direction, FIG. 14 is a side view of a light body assembly 12 in a high bay light 10 of the embodiment in a 85° light-emitting projection direction, FIG. 15 is a side view of a light body assembly 12 in a high bay light 10 of the embodiment in a 90° light-emitting projection direction, FIG. 16 is a structural diagram of a light body assembly 12 of a high bay light 10 of the embodiment in a 90° light-emitting projection direction, and FIG. 17 is a schematic diagram of a light body assembly 12 of a high bay light 10 of the embodiment in a 0° light-emitting projection direction and the other light body assembly 12 in a 90° light-emitting projection direction, so that the irradiation range of the high bay light 10 is not limited, and the high bay light 10 is conveniently applied to different scenes. Meanwhile, the light body assembly 12 of the high bay light 10 of the embodiment may be folded relative to the electrical box 11. When the lampshade 121 of the light body assembly 12 rotates to be opposite to the side wall 117 and parallel to the vertical direction (as shown in FIG. 15 and FIG. 16), a minimum distance H3 between the side surface, close to the side wall 117, of the lampshade 121 and the side wall 117 ranges from 0 mm to 30 mm, so that the width of the high bay light 10 in the horizontal direction may be effectively reduced, thereby effectively reducing the overall volume size of the high bay light 10, effectively reducing the packaging space and transportation cost of the product, and reducing the unit price of the product. When the lampshade 121 rotates to be opposite to the panel wall 115 and parallel to the horizontal direction (as shown in FIGS. 1-3), a minimum distance H4 between the side surface, close to the panel wall 115, of the lampshade 121 and the panel wall 115 ranges from 0 mm to 30 mm, so that the height of the high bay light 10 in the vertical direction may be effectively reduced, thereby effectively reducing the overall volume size of the high bay light 10, effectively reducing the packaging space and transportation cost of the product, and reducing the unit price of the product. Therefore, the high bay light 10 of the embodiment, the light-emitting projection direction is adjustable, a folding operation is achieved, and structure is compact, and the overall size of the high bay light 10 may be effectively reduced, thereby effectively reducing the packaging space and transportation cost of the product, and further reducing the unit price of the product.

Specifically, the lampshade 121 of the embodiment rotates to be opposite to the side wall 117 and parallel to the vertical direction, the minimum distance H3, between the side surface, close to the side wall 117, of the lampshade 121 and the side wall 117 ranges from 0 mm to 20 mm; and/or, when the lampshade 121 rotates to be opposite to the panel wall 115 and parallel to the horizontal direction, the minimum distance H4 between the side surface, close to the panel wall 115, of the lampshade 121 and the panel wall 115 ranges from 0 mm to 20 mm. Further, the lampshade 121 of the embodiment rotates to be opposite to the side wall 117 and parallel to the vertical direction, the minimum distance H3 between the side surface, close to the side wall 117, of the lampshade 121 and the side wall 117 ranges from 0 mm to 7 mm; and/or, when the lampshade 121 rotates to be opposite to the panel wall 115 and parallel to the horizontal direction, the minimum distance H4 between the side surface, close to the panel wall 115, of the lampshade 121 and the panel wall 115 ranges from 0 mm to 7 mm. In an embodiment, the lampshade 121 of the embodiment rotates to be opposite to the side wall 117 and parallel to the vertical direction, the minimum distance H3 between the side surface, close to the side wall 117 of the lampshade 121 and the side wall 117 is one of 0 mm, 2 mm, 5 mm, 7 mm, 10 mm, 20 mm and 30 mm. When the lampshade 121 rotates to be opposite to the panel wall 115 and parallel to the horizontal direction, the minimum distance H4 between the side surface, close to the panel wall 115, of the lampshade 121 and the panel wall 115 is one of 0 mm, 2 mm, 5 mm, 7 mm, 10 mm, 20 mm and 30 mm.

The connecting walls 1212 at both ends of the lampshade 121 of the high bay light 10 of the embodiment are rotatably hinged to the supporting walls 111 at both ends of the electrical box 11 through anti-loosening structures 13, respectively. Each anti-loosening structure 13 includes an anti-loosening screw 131 and an elastic ring pad 132. A threaded section of the anti-loosening screw 131 passes through one supporting wall 111 and is in threaded connection with one connecting wall 1212, or the threaded section of the anti-loosening screw 131 passes through one connecting wall 1212 and is in threaded connection with one supporting wall 111. The elastic ring pad 132 is sleeved on the threaded section of the anti-loosening screw 131, and both ends of the elastic ring pad 132 are pressed between one supporting wall 111 and one connecting wall 1212. Specifically, all surfaces of both ends of the elastic ring pad 132 are pressed between one supporting wall 111 and one connecting wall 1212.

In the operation process of adjusting the light-emitting projection direction of the high bay light 10 of the embodiment, because the anti-loosening structure 13 of the high bay light 10 of the embodiment includes the anti-loosening screw 131 and the elastic ring pad 132, the threaded section of the anti-loosening screw 131 passes through one supporting wall 111 and is in threaded connection with one connecting wall 1212, or the threaded section of the anti-loosening screw 131 passes through one connecting wall 1212 and is in threaded connection with one supporting wall 111, the connecting walls 1212 at both ends of the lampshade 121 are rotatably hinged to the supporting walls 111 at both ends of the electrical box 11, respectively. Meanwhile, the elastic ring pad 132 is sleeved on the threaded section of the anti-loosening screw 131, and both ends of the elastic ring pad 132 are pressed between one supporting wall 111 and one connecting wall 1212. The elastic ring pad 132 is provided with an elastic deformation capability, so that the angle between the light body assembly 12 and the electrical box 11 may be maintained, and the angle between the two may be prevented from being changed by a relatively small force, thereby stably keeping the light body assembly 12 and the electrical box 11 at the angle in the required light-emitting projection direction. Therefore, a user only needs to overcome the friction force of the elastic ring pad 132 to rotate the light body assembly 12 of the high bay light 10 to the angle in the required light-emitting projection direction relative to the electrical box 11, without too many other operation steps, and the operation is simple and convenient. As shown in FIGS. 12-17, the high bay light 10 of the embodiment is adjusted to different light-emitting projection directions, FIG. 12 is a side view of a light body assembly 12 in a high bay light 10 of the embodiment in a 30° light-emitting projection direction, FIG. 13 is a side view of a light body assembly 12 in a high bay light 10 of the embodiment in a 60° light-emitting projection direction, FIG. 14 is a side view of a light body assembly 12 in a high bay light 10 of the embodiment in a 85° light-emitting projection direction, FIG. 15 is a side view of a light body assembly 12 in a high bay light 10 of the embodiment in a 90° light-emitting projection direction, FIG. 16 is a structural diagram of a light body assembly 12 of a high bay light 10 of the embodiment in a 90° light-emitting projection direction, and FIG. 17 is a schematic diagram of a light body assembly 12 of a high bay light 10 of the embodiment in a 0° light-emitting projection direction and the other light body assembly 12 in a 90° light-emitting projection direction. Therefore, the angle in the light-emitting projection direction of the light body assembly 12 of the high bay light 10 of the embodiment is adjustable, so that the irradiation range of the high bay light 10 is not limited, and the high bay light 10 is conveniently applied to different scenes. Meanwhile, the light body assembly 12 of the high bay light 10 of the embodiment may be folded relative to the electrical box 11, which may reduce the overall size of the high bay light 10, thereby reducing the packaging space and reducing the unit price of the product. In addition, the adjustment and folding operations of the light-emitting projection direction of the high bay light 10 of the embodiment are simple and convenient, compared with the complex structure of the existing high bay light for adjusting the light-emitting projection direction, the high bay light 10 of the embodiment directly uses the connecting walls 1212 at both ends of the lampshade 121 to be rotatably hinged to the supporting walls 111 at both ends of the electrical box 11 through the anti-loosening structures 13, respectively, without additionally arranging parts or structural features such as a pull rod, an angle adjustment hole, a supporting plate and an end cover plate, so as to simplify the structural design, so that the structure of the high bay light 10 of the present disclosure is simple, and the production cost may be effectively reduced.

Specifically, in the embodiment, one side surface, close to the adjacent supporting wall 111, of each connecting wall 1212 is provided with a ring groove 1215 coaxial with the threaded section of the anti-loosening screw 131, a first end of the elastic ring pad 132 is embedded in ring groove 1215, a second end of the elastic ring pad 132 protrudes from the ring groove 1215, and both ends of the elastic ring pad 132 are pressed between the supporting wall 111 and a groove bottom surface of the ring groove 1215, respectively, so that the angle between the light body assembly 12 and the electrical box 11 may be stably maintained, and the angle between the two may be prevented from being changed by a relatively small force, thereby stably keeping the light body assembly 12 and the electrical box 11 at the angle in the required light-emitting projection direction. In an embodiment, before the connecting wall 1212 and the supporting wall 111 are connected in a locking manner through the anti-loosening screw 131, the second end of the elastic ring pad 132 protrudes from the ring groove 1215 by about 2 mm to 3 mm, and after the connecting wall 1212 and the supporting wall 111 are connected in a locking manner through the anti-loosening screw 131, the elastic ring pad 132 is elastically compressed, but the second end of the elastic ring pad 132 still protrudes from the ring groove 1215, so that both ends of the elastic ring pad 132 are respectively pressed between the supporting wall 111 and the groove bottom surface of the annular groove 1215. Furthermore, each supporting wall 111 of the embodiment is provided with a mounting hole 1112 in a penetrating manner, each connecting wall 1212 is provided with a mounting groove 1213, and each connecting wall 1212 is provided with an internal threaded hole 1214 at one end of the mounting groove 1213. The threaded section of the anti-loosening screw 131 sequentially passes through the mounting hole 1112 and the mounting groove 1213 in a clearance fit manner and is in threaded connection with the internal threaded hole 1214, and a head of the anti-loosening screw 131 is pressed against the side surface, away from the adjacent connecting wall 1212, of the supporting wall 111. That is, the head of the anti-loosening screw 131 is pressed against the side surface, away from the adjacent connecting wall 1212, of the supporting wall 111, and the threaded section of the anti-loosening screw 131 is in threaded connection with the internal threaded hole 1214 of the connecting wall 1212, so that the supporting wall 111 is connected to the connecting wall 1212. Meanwhile, the threaded section of the anti-loosening screw 131 sequentially passes through the mounting hole 1112 of the supporting wall 111 and the mounting groove 1213 of the connecting wall 1212 in a clearance fit manner, so that the connecting wall 1212 of the lampshade 121 may rotate relative to the supporting wall 111 of the electrical box 11. The lampshade 121 of the embodiment is located between the supporting walls 111 at both ends of the electrical box 11, and one surface of the lampshade 121, away from the electrical box 11, is provided with a light-emitting surface 1211.

Further, the number of the light body assemblies 12 of the embodiment is two, and the two light body assemblies 12 are symmetrically arranged about the electrical box 11. The number of the anti-loosening structures 13 is four, and the two anti-loosening structures 13 are adapted to one light body assembly 12. As shown in FIG. 2, when light-emitting projection directions of the two light-emitting surfaces 1211 of the two light body assemblies 12 are the same, a backlight surface, which is opposite to the light-emitting surface 1211 of each lampshade 121, is adjacent to or attached to the panel wall 115 of the electrical box 11. That is, the backlight surface of each lampshade 121 is adjacent or attached to the panel wall 115 of the electrical box 11, the panel wall 115 of the electrical box 11 is opposite to the mounting wall of the electrical box 11, and the two lampshades 121 are adjacent or attached to each other side by side, so that a gap is not reserved between the two light body assemblies 12 as much as possible, thereby forming a whole surface to emit light, greatly improving the light-emitting area of the product, while making the product have a compact structure and a small volume, and reducing the space occupation. In addition, as shown in FIG. 15 and FIG. 16, when light-emitting projection directions of the two light-emitting surfaces 1211 of the two light body assemblies 12 are opposite, two backlight surfaces, which are opposite to the light-emitting surfaces 1211 of the two lampshades 121, are respectively adjacent to or attached to two opposite side walls 117 of the electrical box 11. That is, the backlight surfaces of the two lampshades 121 are respectively adjacent or attached to two opposite side walls 117 of the electrical box 11, the two side walls 117 of the electrical box 11 are arranged at both ends of the panel wall 115 and are respectively connected between the panel wall 115 of the electrical box 11 and the mounting wall of the electrical box 11, and the panel wall 115 of the electrical box 11 is opposite to the mounting wall of the electrical box 11, which further reduces the overall size of the high bay light 10 after folding, thereby further reducing the packaging space and further reducing the unit price of the product. Specifically, the two opposite side walls 117 of the electrical box 11 of the embodiment are arranged perpendicular to the panel wall 115, and further, the side wall 117 may extend in the vertical direction, and the panel wall 115 extends in the horizontal direction. In an embodiment, a distance H1 between an axis of the anti-loosening screw 131 of the embodiment and the panel wall 115 of the electrical box 11 is greater than or equal to half of a thickness H5 of the lampshade 121 in the light-emitting projection direction of the light-emitting surface 1211; and/or, a distance H2 between the axis of the anti-loosening screw 131 and the side surface of the electrical box 11 is greater than or equal to half of the thickness H5 of the lampshade 121 in the light-emitting projection direction of the light-emitting surface 1211. In an embodiment, the thickness H5 of the lampshade 121 in the light-emitting projection direction of the light-emitting surface 1211 is 24.8 mm, the distance H2 between the axis of the anti-loosening screw 131 and the side surface of the electrical box 11 is 16.8 mm, and the distance H1 between the axis of the anti-loosening screw 131 and the panel wall 115 of the electrical box 11 is 15.4 mm.

In order to improve the stability of the threaded connection between the threaded section of the anti-loosening screw 131 and the internal threaded hole 1214 of the connecting wall 1212, a peripheral wall of the threaded section of the anti-loosening screw 131 of the embodiment is coated with an anti-loosening adhesive layer. The anti-loosening adhesive layer is a high-viscosity, non-toxic and thixotropic plastic layer/glue layer, and coats the peripheral wall of the threaded section of the anti-loosening screw 131 through a spraying technology or a dispensing technology. In the process of tightening the threaded connection between the threaded section of the anti-loosening screw 131 and the internal threaded hole 1214 of the connecting wall 1212, the anti-loosening adhesive layer is extruded to generate strong reaction force and friction force, so that the threaded section of the anti-loosening screw 131 is prevented from retreating, and the anti-loosening effect is achieved.

The light source 122 of the embodiment is arranged in the lampshade 121, one surface, away from the electrical box 11, of the lampshade 121 is provided with the light-emitting surface 1211, and the side, close to the light source 122, of the light-emitting surface 1211 is provided with one or more of an anti-glare panel 123, a diffusion plate and a light-transmitting plate. The anti-glare panel 123 is configured to prevent glare from dazzling, the diffusion plate is configured to further expand the light-emitting area, and the light-transmitting plate is configured to enhance the degree of polymerization or refraction range of the light. The light-emitting surface 1211 of the lampshade 121 may be a light-transmitting and opaque wall surface, or may be a light-transmitting and transparent wall surface, and the transparent and transparent wall surface enables the user to see the internal light source 122, and is provided with a different visual effect.

In order to ensure the working stability and the working reliability of the high bay light 10 of the embodiment, and prolong the service life of the high bay light 10 of the embodiment, the side wall 117 of the electrical box 11 of the embodiment is provided with a heat dissipation hole 112 in a penetrating manner, and the heat dissipation hole 112 dissipates heat of the power supply 14 in the electrical box 11. Meanwhile, the light body assembly 12 further includes a radiator 124, the radiator 124 is arranged in the lampshade 121 and located on the backlight surface, away from the light exit surface 1211, of the light source 122, and the radiator 124 dissipating heat of the light source 122. The lampshade 121 of the embodiment may be made of a material with a relatively strong heat conduction capability, so that the lampshade 121 is provided with the capability of dissipating heat of the light source 122. In addition, in order to ensure that the user is able to accurately adjust the angle in the required light-emitting projection direction, one side surface of each supporting wall 111 of the embodiment is provided with an angle pointer 1113, one side surface of each connecting wall 1212 is provided with an angle dial 1216 around a rotating hinged axis, that is, one side surface of each connecting wall 1212 is provided with the angle dial 1216 around the anti-loosening screw 131. Or, one side surface of each connecting wall 1212 is provided with the angle pointer 1113, and one side surface of each supporting wall 111 is provided with the angle dial 1216 around the rotating hinged axis, that is, one side surface of each supporting wall 111 is provided with the angle dial 1216 around the anti-loosening screw 131. The angle pointer 1113 may be aligned with any angle scale line in the angle dial 1216, so that the user is able to intuitively know the specific value of the rotatably adjusted angle in the light-emitting projection direction of the light body assembly 12 relative to the electrical box 11, thereby improving the accuracy of adjustment of the angle in the light-emitting projection direction.

Referring to FIGS. 8-11, the electrical box 11 of the embodiment includes the panel wall 115 and a box body with an opening at 115 one end. The panel wall 115 may cover the opening, the side wall 117 is a part of a peripheral wall of the box body, an electrical assembly is mounted on a side surface, close to the box body, of the panel wall 115, and the electrical assembly includes a power supply 14, a dimmer switch 142 and a toning switch 141. Specifically, the panel wall 115 of the embodiment is detachably mounted at the opening in a covering manner, or a first end of the panel wall 115 of the embodiment is rotatably hinged to the box body, and a second end of the panel wall 115 is connected to the box body through a set screw 16, so that the panel wall 115 covers the opening of the box body. The electrical assembly is mounted on the side surface, close to the box body, of the panel wall 115 and may be located in the box body, thereby facilitating the mounting and maintenance of the electrical box 11. After the set screw 16 is unscrewed, the panel wall 115 rotates to open the opening of the box body, and the electrical assembly arranged on the panel wall 115 rotates out of the box body at the same time, so that the device in the box body is reduced, the user is able to conveniently see the mounting structure on one side of the mounting wall of the box body, the user is able to conveniently mount the light, meanwhile, the user is able to conveniently maintain or disassemble the electrical assembly, the structure is simple, and the operation is convenient and fast.

In an embodiment, the first end of the panel wall 115 of the embodiment is rotatably hinged to the box body through a hinge screw 15, that is, the peripheral wall of the box body is provided with a through hole 116 in a penetrating manner, the first end of the panel wall 115 is provided with a screw hole 1151, the threaded section of the hinge screw 15 penetrates through the through hole 116 in a clearance fit manner and is in threaded connection with the screw hole 1151 of the panel wall 115, and a head of the hinge screw 15 is pressed against an end surface, away from the panel wall 115, of the peripheral wall of the box body.

Figure 18:
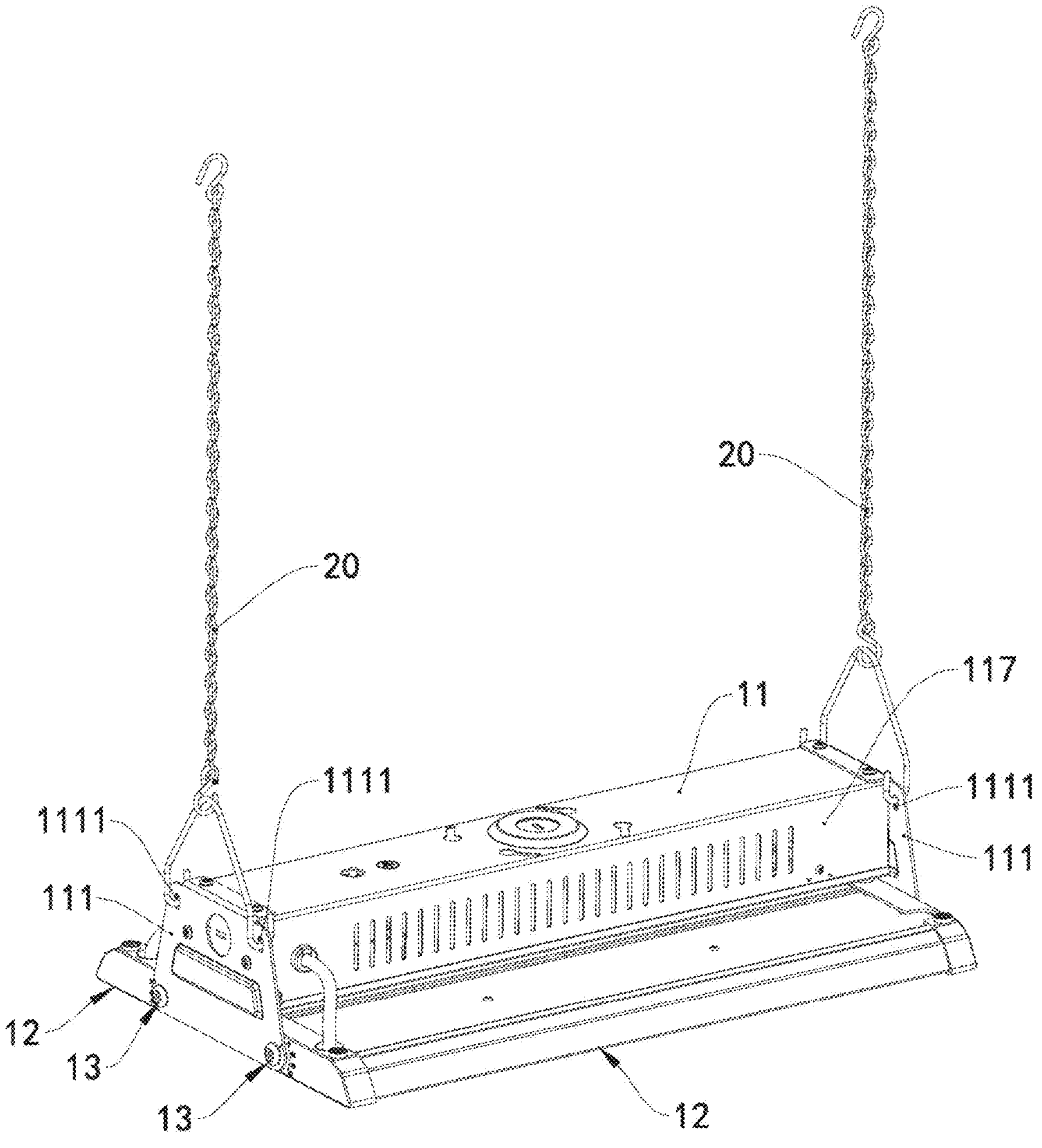
FIG. 18 is a structural diagram of an embodiment of a high bay light of the present disclosure when mounted in a lifting manner.

In conjunction with FIG. 18, each supporting wall 111 of the embodiment is provided with a lifting hole 1111 for lifting of a sling chain 20 in a penetrating manner; or, each supporting wall 111 is provided with two lifting holes 1111 for lifting of the sling chain 20 in a penetrating manner, and the two lifting holes 1111 are symmetrically arranged about the electrical box 11, so that the electrical box 11 of the high bay light 10 of the embodiment is mounted in a lifting manner through the sling chain 20.

Figure 19:
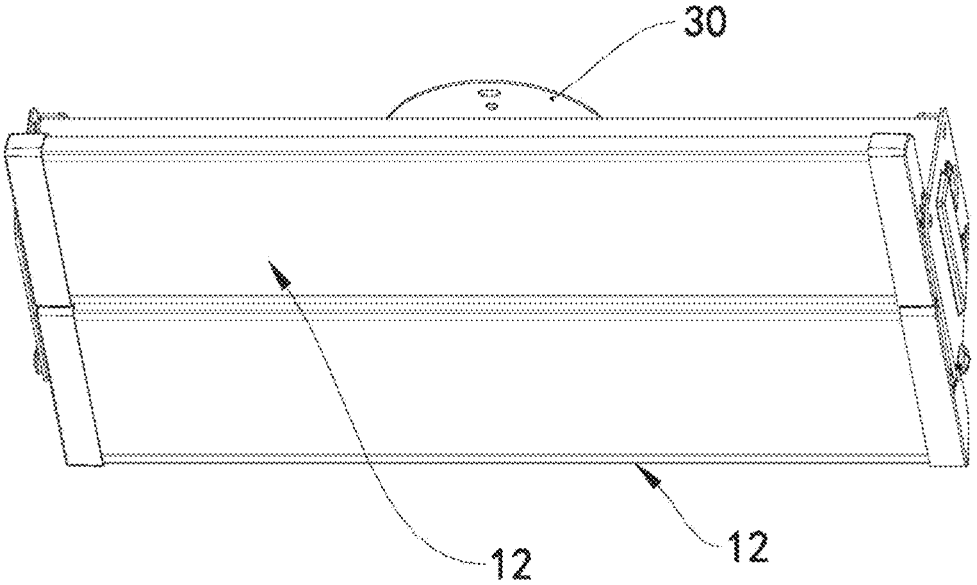
FIG. 19 is a structural diagram of an embodiment of a high bay light of the present disclosure when mounted at a ceiling.

In conjunction with FIG. 19, a mounting wall of the electrical box 11 of the embodiment is provided with a fixed groove 114 for being matched with a fixed pin of a ceiling mounting seat 30, the fixed groove 114 includes an arc-shaped narrow part 1141 and a circular wide part 1142 has a larger width than the arc-shaped narrow part 1141 at one end of the arc-shaped narrow part 1141, the fixed pin is T-shaped, and the fixed pin includes a top extends transversely and a thin part extends vertically. The size of the top is less than that of the circular wide part 1142 and larger than that of the arc-shaped narrow part 1141, and the size of the thin part is less than that of the arc-shaped narrow part 1141, so that the electrical box 11 of the high bay light 10 of the embodiment is mounted at a ceiling.

Figure 20:
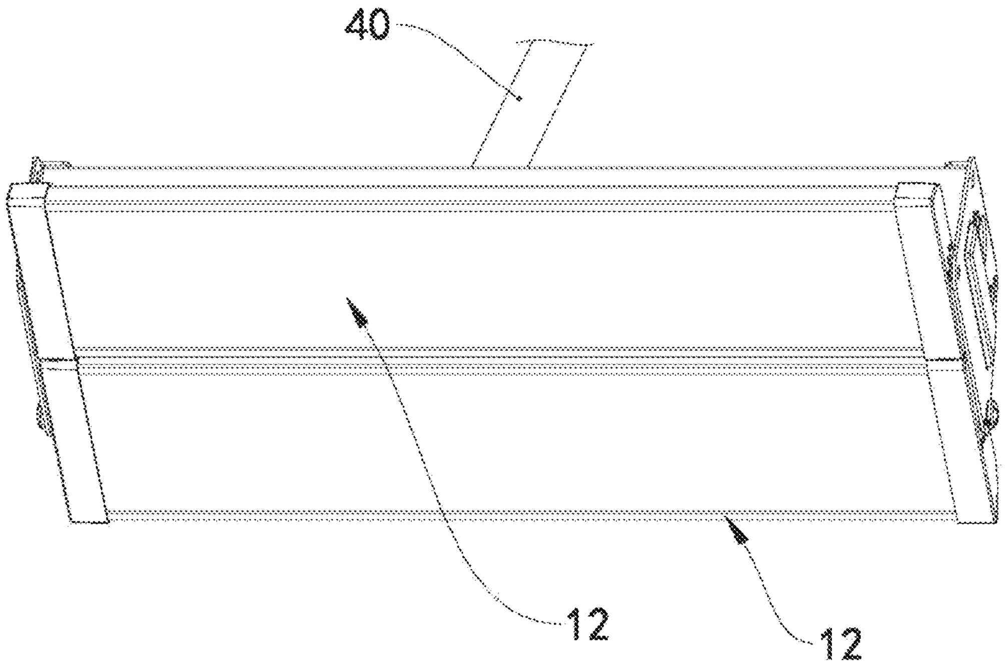
FIG. 20 is a structural diagram of an embodiment of a high bay light of the present disclosure when mounted through a boom.

In conjunction with FIG. 20, the mounting wall of the electrical box 10 of the embodiment is provided with an assembly groove 113 for the mounting of a boom 40, so that the electrical box 11 of the high bay light 10 of the embodiment is mounted in a lifting manner through the boom 40.

Therefore, the high bay light 10 of the embodiment may be mounted in any manner of lifting through the sling chain 20, lifting through the boom 40 and being mounted at the ceiling, so that the present disclosure range of the product is wider, and the market competitiveness of the product is improved.

The above embodiment is the preferred embodiment of the present disclosure and is not intended to limit the scope of implementation of the present disclosure. Any equivalent changes or modifications made within the structures, features and principles of the patent scope of the present disclosure shall fall within the scope of the present disclosure.

The invention claimed is:

1. A high bay light, comprising an electrical box and a light body assembly, and the electrical box is provided with a power supply, the light body assembly comprises a lampshade provided with a light source, the light source is electrically connected to the power supply, and connecting walls at both ends of the lampshade are rotatably hinged to supporting walls at both ends of the electrical box, respectively, the electrical box comprises a side wall and a panel wall which are adjacently arranged;

when the lampshade rotates to position a light-emitting surface of the lampshade perpendicular to the panel wall, a minimum distance between a side surface, close to the side wall, of the lampshade and the side wall ranges from 0 mm to 30 mm;

and, when the lampshade rotates to position the light-emitting surface of the lampshade parallel to the panel wall, a minimum distance between a side surface, close to the panel wall, of the lampshade and the panel wall ranges from 0 mm to 30 mm.

2. The high bay light according to claim 1, wherein, when the lampshade rotates to position the light-emitting surface of the lampshade perpendicular to the panel wall, the minimum distance between the side surface, close to the side wall, of the lampshade and the side wall ranges from 0 mm to 20 mm;

or, when the lampshade rotates to position the light-emitting surface of the lampshade parallel to the panel wall, the minimum distance between the side surface, close to the panel wall, of the lampshade and the panel wall ranges from 0 mm to 20 mm.

3. The high bay light according to claim 2, wherein, when the lampshade rotates to position the light-emitting surface of the lampshade perpendicular to the panel wall, the minimum distance between the side surface, close to the side wall, of the lampshade and the side wall ranges from 0 mm to 7 mm;

or, when the lampshade rotates to position the light-emitting surface of the lampshade parallel to the panel wall, the minimum distance between the side surface, close to the panel wall, of the lampshade and the panel wall ranges from 0 mm to 7 mm.

4. The high bay light according to claim 1, wherein, the number of the light body assemblies is two, and the two light body assemblies are symmetrically arranged about the electrical box.

5. The high bay light according to claim 4, wherein, one surface of the lampshade, away from the electrical box, is provided with the light-emitting surface;

when light-emitting projection directions of the two light-emitting surfaces are the same, a backlight surface, which is opposite to the light-emitting surface of each lampshade, is adjacent to or attached to the panel wall;

or, when light-emitting projection directions of the two light-emitting surfaces are the same, the two lampshades are adjacent or attached to each other side by side;

or, when light-emitting projection directions of the two light-emitting surfaces are opposite, two backlight surfaces, which are opposite to the light-emitting surfaces of the two lampshades, are respectively adjacent to or attached to two opposite side walls of the electrical box.

6. The high bay light according to claim 1, wherein, the connecting walls are rotatably hinged to the supporting walls through anti-loosening structures.

7. The high bay light according to claim 6, wherein, each anti-loosening structure comprises an anti-loosening screw and an elastic ring pad, and a threaded section of the anti-loosening screw passes through one supporting wall and is in threaded connection with one connecting wall, or the threaded section of the anti-loosening screw passes through one connecting wall and in threaded connection with one supporting wall; and the elastic ring pad is sleeved on the threaded section of the anti-loosening screw, and both ends of the elastic ring pad are pressed between one supporting wall and one connecting wall.

8. The high bay light according to claim 7, wherein, one side surface, close to the adjacent supporting wall, of each connecting wall is provided with a ring groove coaxial with the threaded section of the anti-loosening screw, a first end of the elastic ring pad is embedded in the ring groove, a second end of the elastic ring pad protrudes from the ring groove, and both ends of the elastic ring pad are pressed between the supporting wall and a groove bottom surface of the ring groove, respectively.

9. The high bay light according to claim 7, wherein, each supporting wall is provided with a mounting hole, each connecting wall is provided with a mounting groove, and each connecting wall is provided with an internal threaded hole at one end of the mounting groove; and the threaded section of the anti-loosening screw sequentially passes through the mounting hole and the mounting groove in a clearance fit manner and is in threaded connection with the internal threaded hole, and a head of the anti-loosening screw is pressed against the side surface, away from the adjacent connecting wall, of the supporting wall.

10. The high bay light according to claim 7, wherein, a peripheral wall of the threaded section of the anti-loosening screw is coated with an anti-loosening adhesive layer;

or, all surfaces of both ends of the elastic ring pad are pressed between one supporting wall and one connecting wall.

11. The high bay light according to claim 1, wherein, the light source is arranged in the lampshade, one surface, away from the electrical box, of the lampshade is provided with a light-emitting surface, and the side, close to the light source, of the light-emitting surface is provided with one or more of an anti-glare panel, a diffusion plate and a light-transmitting plate;

or, the side wall of the electrical box is provided with a heat dissipation hole in a penetrating manner;

or, the light body assembly further comprises a radiator, the radiator is arranged in the lampshade and located on a backlight surface of the light source.

12. The high bay light according to claim 1, wherein, each supporting wall is provided with a lifting hole for lifting of a sling chain in a penetrating manner; or, each supporting wall is provided with two lifting holes for lifting of the sling chain in a penetrating manner, and the two lifting holes are symmetrically arranged about the electrical box;

or, a mounting wall of the electrical box is provided with a fixed groove for being matched with a fixed pin of a ceiling mount seat, the fixed groove comprises an arc-shaped narrow part and a circular wide part has a larger width than the arc-shaped narrow part at one end of the arc-shaped narrow part, the fixed pin is T-shaped, the fixed pin comprises a top extends transversely and a thin part extends vertically, and a size of the top is less than that of the circular wide part and greater than that of the arc-shaped narrow part, and a size of the thin part is less than that of the arc-shaped narrow part;

or, a mounting wall of the electrical box is provided with an assembly groove for mounting of a boom.

13. The high bay light according to claim 1, wherein, one side surface of each supporting wall is provided with an angle pointer, one side surface of each connecting wall is provided with an angle dial around a rotating hinged axis, or, one side surface of each connecting wall is provided with an angle pointer, and one side surface of each supporting wall is provided with an angle dial around the rotating hinged axis; and the angle pointer may be aligned with any angle scale line in the angle dial.

14. The high bay light according to claim 1, wherein, the side wall is arranged perpendicular to the panel wall.

15. The high bay light according to claim 1, wherein, the electrical box comprises the panel wall and a box body with an opening at one end, and the panel wall may cover the opening, the side wall is a part of a peripheral wall of the box body, an electrical assembly is mounted on a side surface, close to the box body, of the panel wall, and the electrical assembly comprises the power supply.

16. The high bay light according to claim 15, wherein, a first end of the panel wall is rotatably hinged to the box body, and a second end of the panel wall is connected to the box body through a set screw, so that the panel wall covers the opening;

or, the panel wall is detachably mounted at the opening in a covering manner.

17. The high bay light according to claim 1, wherein, the number of the light body assemblies is two, during the process where the light body assemblies are rotated from a position parallel to a horizontal direction to a position parallel to a vertical direction, the two light body assemblies have either symmetrical positions or asymmetrical positions relative to the central axis of the electrical box.

18. The high bay light according to claim 8, wherein, before the connecting wall and the supporting wall are connected in a locking manner through the anti-loosening screw, the second end of the elastic ring pad protrudes from the ring groove by about 2 mm to 3 mm.

19. The high bay light according to claim 7, wherein, a distance H1 between an axis of the anti-loosening screw and the panel wall of the electrical box is greater than or equal to half of a thickness H5 of the lampshade in the light-emitting projection direction of the light-emitting surface.

20. The high bay light according to claim 7, wherein, a distance H2 between an axis of the anti-loosening screw and the side surface of the electrical box is greater than or equal to half of the thickness H5 of the lampshade in the light-emitting projection direction of the light-emitting surface.

* * * * *